July 24, 1928.
R. W. MAUDSLAY
1,678,262
ROOF FOR CLOSED VEHICLE BODIES
Filed Aug. 10, 1926  2 Sheets-Sheet 2
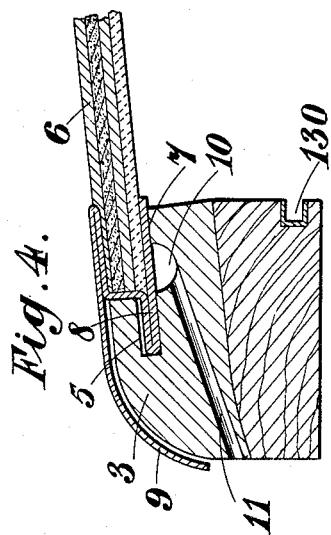
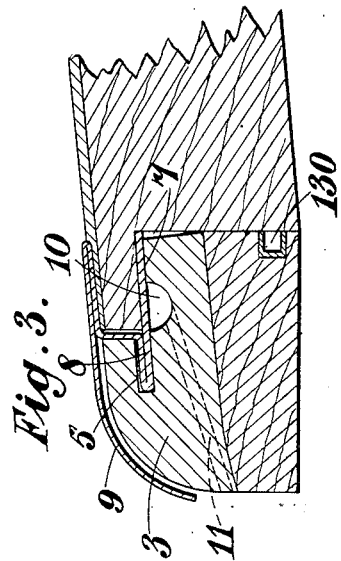
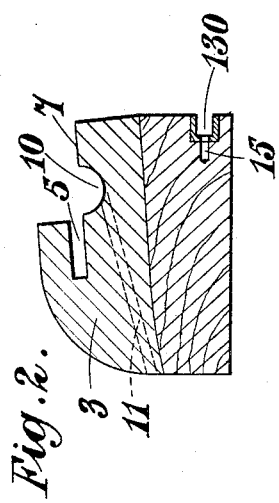
Reginald Walter Maudslay
Inventor
by Edw. [signature]
his Attorney Patented July 24, 1928.

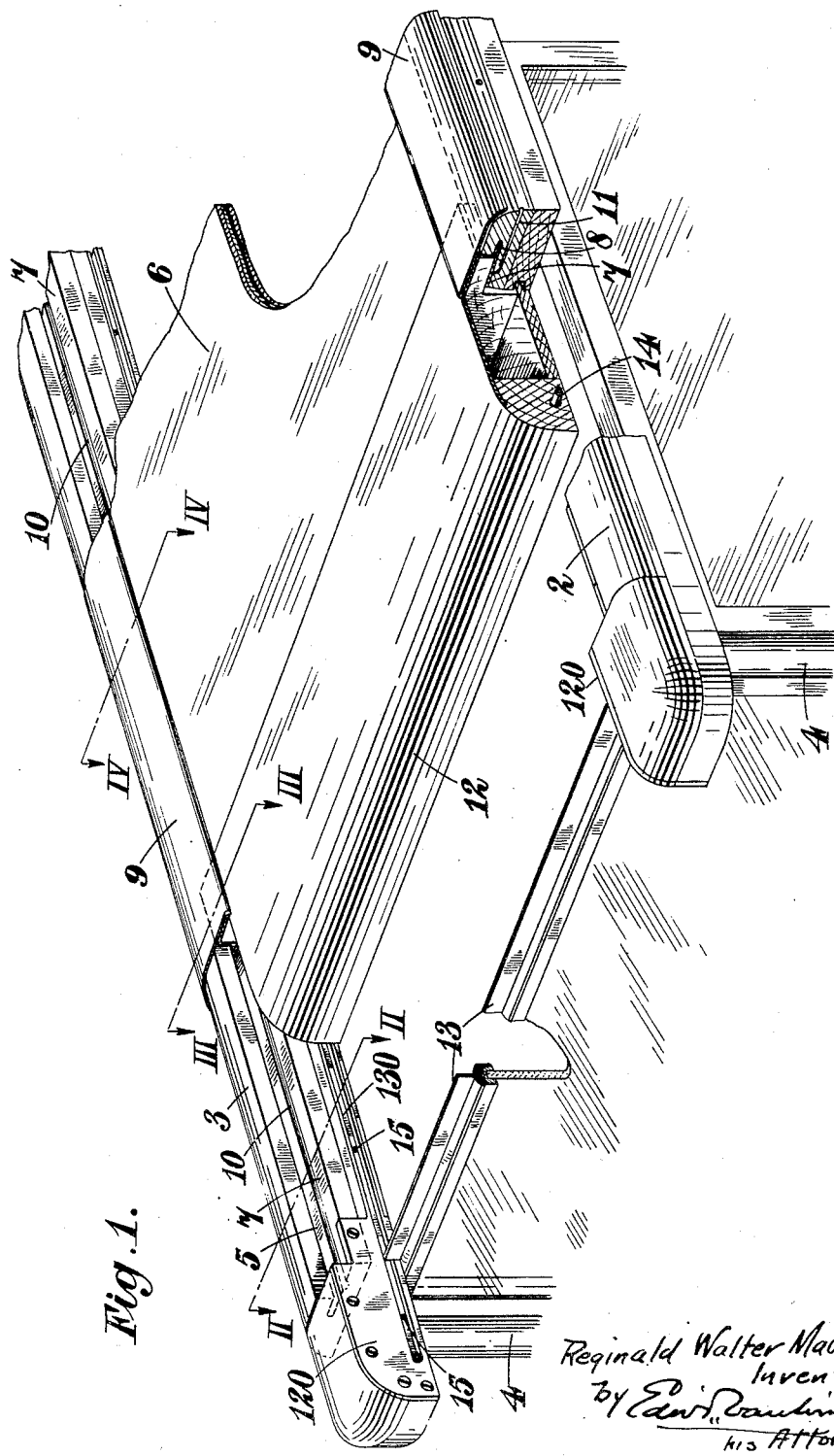

1,678,262

UNITED STATES PATENT OFFICE.

REGINALD WALTER MAUDSLAY, OF COVENTRY, ENGLAND.

ROOF FOR CLOSED VEHICLE BODIES.

Application filed August 10, 1926, Serial No. 128,425, and in Great Britain March 27, 1926.

This invention relates to closed vehicle bodies of the kind which have a sliding roof portion or hatch, which enables a closed body to be converted into one which is partially open.

Usually the movable portion closes an aperture in the roof proper, and when moved leaves across the front a part of the roof which is objectionable, as it obstructs the upper and forward vision of the occupants.

The object of the present invention is to overcome this, which is effected by providing the front of the roof with a pair of rails, one at each side, which extends to the extreme front and are secured to the windscreen pillars, whilst the sliding hatch is guided on the rails and extends to the extreme front.

Suitable arrangements are made to ensure a water and draught-tight joint between the front edge and the top of the windscreen, and similar joints may be assured at the sides by any suitable means.

In the accompanying drawings,

Figure 1 is a perspective view from above showing the front part of a roof and the front and side screens of a motor vehicle, the roof having a sliding hatch constructed in accordance with the invention.

Figures 2, 3 and 4 are sections on the lines II—II, III—III and IV—IV of Figure 1.

Like numerals indicate like parts throughout the drawings.

The front part of the roof is formed at each side with side rails 2 and 3 the front ends of which are secured to the windscreen pillars 4. These rails are stepped and also channelled horizontally at 5 as is shown in Figures 2, 3 and 4. The sliding hatch portion 6 rests upon the steps 7, and flanges or lips 8 on the hatch enter the channels 5. These flanges may be of the section shown having an upper flange 9, which overlaps the side rails 3, thus reducing the possibility of water passing over these rails, and also producing a neat appearance. In each step 7 may be formed a longitudinal groove 10 with lateral drains 11, so that no water can enter the body.

The hatch consists of a rectangular metal or other panel lined on the underside with material to suit the interior of the body, and coated on the top with leather or any other material suitable for the outside, whilst layers of felt may be employed on one or both sides of the panel to prevent drumming.

The front edge of the panel 6 is attached to a front roof rail 12 in the form of a nose-piece, which is adapted to slide between the side rails and may be secured by a suitable means to the frame of the front windscreen when the hatch is closed. The edge of this roof rail is shaped to conform to the side rails 2 and 3, so that the appearance, when the hatch is closed, is that of an ordinary closed vehicle body roof.

To prevent the passage of water or a draught over the top of the windscreen, the latter may have attached to it an upwardly projecting flap or strip of rubber 13 which is of small dimensions so as to be almost invisible when the hatch is open but is rolled over or bent forwards and forms a kind of packing between the screen and the underside of the rail when the hatch is closed.

Preferably the inner ends of the side rails are metal faced at 120, and, where desirable, this metal facing may extend backwards, forming a metal channel 130 in which may slide the ends of transversely arranged locking rods 14. These rods may be adapted to engage holes 15 in the channel, so as to lock the sliding hatch in the open and closed positions.

The side rails may be of wood, rubber, or composition.

What I claim as my invention and desire to secure by Letters Patent of the United States is:—

1. In a closed vehicle body, the combination of a roof, an aperture in front thereof, a stepped rail at each side of said aperture provided with a longitudinal slot in the upper vertical face of the step, said rail extending to the extreme front of the roof, a rigid hatch adapted to slide on said steps and when in one position to close said aperture, a member interposed between the rail and the hatch adapted to engage the longitudinal slot and embrace the lateral edges of the hatch and cover the joint therebetween.

2. In a closed vehicle body, the combination of a roof, an aperture at the front thereof, a rail at each side of said aperture, a step in each rail, a channel formed in the upper vertical face of each step, a rigid sliding hatch resting on said step and having its upper face level with the upper faces of said rails, and flanges on the edges of said hatch engaging the channels in said steps, substantially as set forth.

3. The device of claim 2 in which the flanges in the rails are substantially H section with one arm extended and curved to cover the top of the rails.

In testimony whereof I have signed my name to this specification.

REGINALD WALTER MAUDSLAY.